Patented July 7, 1936

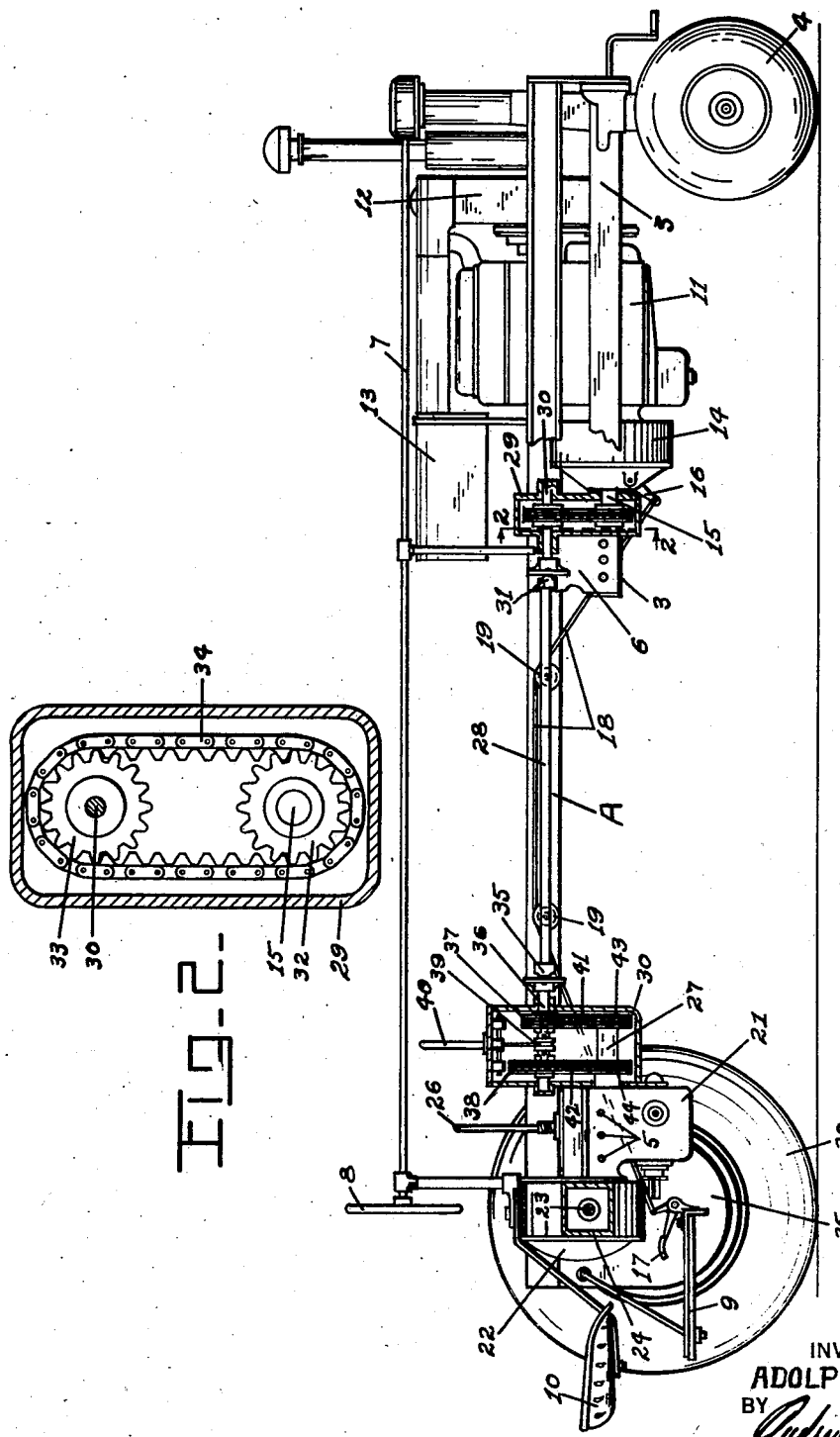

2,046,429

UNITED STATES PATENT OFFICE 2,046,429

TRACTION MACHINE

Adolph Ronning, Minneapolis, Minn.

Application November 29, 1935, Serial No. 52,126

5 Claims. (Cl. 180—70)

This invention relates to traction equipment of the general type which, for economic and practical reasons incorporates the use of standard or conventional tractor engine and other parts, and the main object is to provide certain improvements in the controls and power transmission mechanism between the power plant and rear end parts of the machine, when the tractor is converted into a rearranged assembly and harnessed into a frame work in order to adapt the tractor to various commercial uses, and to give greater clearance for various implements and mechanisms incorporated in the machine. The invention particularly contemplates certain improvements in the structure disclosed in my copending patent application Serial No. 35,727, filed August 12th, 1935, for Power grader, and wherein is illustrated and described how the converted and rearranged tractor parts are combined in a frame structure and in association with a road working implement with power connections and operative controls therefor. The machine may also be designed to accommodate other implements such as scarifiers, plows, cultivators, etc., and in any event when such implements are carried by the connecting frame it is obviously desirable to secure as much vertical clearance for them as possible in order that they may be properly manipulated and controlled. To this end I have in the present disclosure vertically offset certain connections between the front and rear tractor units and provided mountings, housings, and drive connections so as to render such rearranged parts operative.

The invention and its more detailed purposes and objects will be more specifically described in the course of the following specification, reference being had to the accompanying drawing, wherein:

Fig. 1 is a side elevation of the machine (corresponding to Fig. 5 in Ser. No. 35,727), but with the implement and its connections removed and with various parts broken away and in section for purpose of illustration.

Fig. 2 is an enlarged detail section on the line 2—2 in Fig. 1.

In constructing a machine embodying the present invention, I preferably employ a tractor of a well known commercial type, as shown, because such design of tractor is particularly adapted for this machine as it can be very quickly and conveniently separated into two units in the manner here contemplated.

The front or forward unit of the tractor comprises a pair of laterally disposed frame beams 3, the front ends of which are supported on a front steering truck 4. The rear ends of these beams, in the normal tractor arrangement, are secured by bolts which screw into holes 5 in the cast body housing of the rear unit, but in the converted arrangement the rear beam ends are similarly secured to a cross beam 6 of the interconnecting frame. The steering truck 4 is angled or steered by a suitable mechanism including a steering shaft 7 at the rear end of which is provided a hand wheel 8 within convenient reach of the operator either when standing on the platform 9 or when in the seat 10, both carried by the rear unit. The forward tractor unit also includes the engine or power plant 11, radiator 12, and gasoline tank 13. To the rear of the engine is secured the conventional clutch housing 14 having a clutch for connecting and disconnecting the engine crank shaft with respect to a rearwardly extending stub shaft 15.

The clutch has an operating lever 16 which is ordinarily actuated by a link or rod extending directly back to a foot pedal near the operator's station. Such connection, however, is found to interfere with implements and other mechanisms disposed between the two separated tractor units. To provide full clearance for such mechanisms I therefore connect the clutch lever 16 and the actuating foot lever 17 by a flexible cable 18 which extends up and passes over pulleys 19 secured on the connecting frame A between the two tractor units. This frame may follow the general design disclosed in my aforesaid application Ser. No. 35,727, but in any event forms a rigid connection between the two tractor units, and of course also provides convenient means for attaching working implements in operative position between the two tractor units.

The rear tractor unit is supported on transversely spaced, relatively large traction wheels 20, and includes speed change transmission in housing 21, differential housing 22, rear axle 23, axle housing 24, and drive gear and brake housing 25, all grouped in the same compact assembly as in the normal tractor. A shift lever 26 operates the transmission mechanism, the latter of which is driven by a shaft 27. This shaft, in the normal tractor, is conventionally connected, through a universal joint, directly to the clutch shaft 15, of the forward unit; and in the extended arrangement shown in my previous application these two, separated shafts are connected by an axially aligned supplemental shaft (35). It is found, however, that the supplemental shaft is disposed at such a low level below the connecting frame structure as to interfere with the proper mounting and adjustments of the implement or tools to be carried.

To overcome this difficulty or objection, and also to provide an additional and higher speed drive for the machine, I arrange the intermediate connecting shaft 28 at the same level and transversely between the connecting frame beams A, and then provide power connections between the ends of this shaft 28 and the shafts 15 and 27 respectively. To accommodate these connections and seal them against dust and other foreign matter I provide a pair of housings 29 and 30.

The housing 29 is mounted adjacent the rear end of clutch housing 14, so that the rear end of shaft 15 will project into the lower part of the housing. In the upper end of the housing 29 is journaled a short stud shaft 30 that connects with the fore end of shaft 28 through a flexible universal joint 31. The shafts 15 and 30 are respectively provided with sprocket gears 32 and 33 (Fig. 2) about which passes a toothed chain or link belt 34 which drives one from the other.

At its rear end the shaft 28 is connected by universal joint 35 to a short shaft 36 journaled in the upper end of the housing 30. Upon this shaft 36 are mounted two sprocket gears 37 and 38, which, however, permit the shaft to rotate within themselves except when selectively clutched thereto by a jaw clutch 39 operated by a lever 40.

The gears 37 and 38 operate through chains 41 and 42 to respectively drive pinions 43 and 44, fixed on shaft 27. Gear 37 is preferably of the same diameter as gear 43 so as not to change the driven speed, but gear 38 is preferably larger than gear 44 so as to increase the driven speed to the transmission mechanism when this connection is made, this relatively higher speed and proportionately faster ground travel being particularly desirable when moving the traction implement in idle condition from one work location to another. The gears and drive chains of the housing 30 are preferably of the type used in the forward housing 29, as shown in Fig. 2. The speed selections thus obtainable by shifting lever 40 are of course supplemental to and not substitutes for the usual gear changes controlled by shift lever 26.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination comprising a tractor separated longitudinally into two spaced units, the forward unit including steering truck and power plant, and the rear unit including traction devices and transmission and differential mechanisms, a frame connecting said units to support them in spaced operative positions, said power plant having a power shaft extending rearwardly therefrom and said transmission having a power receiving shaft projecting forwardly in axial alignment with said power shaft but spaced rearwardly therefrom, a power transmitting shaft disposed in radially offset position with respect to said first mentioned shafts, and power connections between the said transmitting shaft and the other shafts, one of said power connections including a speed selecting mechanism.

2. A traction machine comprising a longitudinally extending main frame, a power plant and steerable support at the front end of the frame, said power plant having a power shaft extending rearwardly therefrom; traction members and a transmission mechanism at the rear of the frame, said transmission mechanism having a power receiving shaft disposed in substantial alignment with the power shaft of the power plant but spaced rearwardly therefrom, and power transmitting devices extending upwardly from the power plant shaft and thence rearwardly and downwardly to the power receiving shaft, said power transmitting devices including sprocket gears, and sprocket chains connecting certain pairs of said gears.

3. A traction machine comprising a longitudinally extending main frame, a power plant and steerable support at the front end of the frame, said power plant having a power shaft extending rearwardly therefrom; traction members and a transmission mechanism at the rear of the frame, said transmission mechanism having a power receiving shaft disposed in substantial alignment with the power shaft of the power plant but spaced rearwardly therefrom, and power transmitting devices extending upwardly from the power plant shaft and thence rearwardly and downwardly to the power receiving shaft, said power transmitting devices including a speed selecting mechanism.

4. A traction machine comprising a longitudinally extending main frame, a power plant and steerable support at the front end of the frame, said power plant having a power shaft extending rearwardly therefrom; traction members and a transmission mechanism at the rear of the frame, said transmission mechanism having a power receiving shaft disposed in substantial alignment with the power shaft of the power plant but spaced rearwardly therefrom, and power transmitting devices connecting said shafts and including a third shaft disposed in parallelism with but upwardly offset with respect to the shafts, and sprocket means connecting the third shaft to the other shafts.

5. A traction machine comprising a longitudinally extending main frame, a power plant and steerable support at the front end of the frame, said power plant having a power shaft extending rearwardly therefrom; traction members and a transmission mechanism at the rear of the frame, said transmission mechanism having a power receiving shaft disposed in substantial alignment with the power shaft of the power plant but spaced rearwardly therefrom, and power transmitting devices connecting said shafts and including a third shaft disposed in parallelism with but upwardly offset with respect to the shafts, sprocket gears and chain connecting the front end of the third shaft to said power plant shaft, and a speed selecting device operatively connecting the rear end of the third shaft to the power receiving shaft of the transmission mechanism.

ADOLPH RONNING.